US012749703B2

(12) United States Patent
Kim et al.

(10) Patent No.: US 12,749,703 B2
(45) Date of Patent: Sep. 29, 2026

(54) SYSTEMS AND METHODS OF REDUCING OR PREVENTING MANGANESE METAL FORMATION

(71) Applicant: Rivian IP Holdings, LLC, Plymouth, MI (US)

(72) Inventors: Soo Kim, Fremont, CA (US); Sookyung Jeong, San Jose, CA (US); Tae Kyoung Kim, Albany, CA (US); Ki Tae Park, Santa Clara, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 839 days.

(21) Appl. No.: 18/054,740

(22) Filed: Nov. 11, 2022

(65) Prior Publication Data

US 2024/0162479 A1 May 16, 2024

(51) Int. Cl.
*H01M 10/0562* (2010.01)
*H01M 4/02* (2006.01)
*H01M 4/58* (2010.01)

(52) U.S. Cl.
CPC ....... *H01M 10/0562* (2013.01); *H01M 4/582* (2013.01); *H01M 2004/027* (2013.01); *H01M 2220/20* (2013.01); *H01M 2300/008* (2013.01)

(58) Field of Classification Search
CPC .......................... H01M 4/582; H01M 10/0562
See application file for complete search history.

(56) References Cited

U.S. PATENT DOCUMENTS

2013/0115484 A1 5/2013 Li et al.
2017/0077497 A1* 3/2017 Ogata .................. H01M 4/587
2017/0155175 A1* 6/2017 Halalay ............. H01M 10/0525
2018/0051137 A1* 2/2018 Kim ...................... H01M 4/666
2021/0242454 A1* 8/2021 Basu ..................... H01M 4/505
2022/0384800 A1* 12/2022 Ouyang ................ H01M 4/366

FOREIGN PATENT DOCUMENTS

WO WO-2024/085298 A1 4/2024

OTHER PUBLICATIONS

Xiao, et al., "Unraveling manganese dissolution/deposition mechanisms on the negative electrode in lithium ion batteries," Physical Chemistry Chemical Physics, Apr. 3, 2014, 10398-10402, Vo. 16, Is. 22, The Royal Society of Chemistry.
Zhan, et al., "Mn(II) deposition on anodes and its effects on capacity fade in spinel lithium manganate-carbon systems," Nature Communications, Sep. 30, 2013, 1-8, V. 4:2437.
Office Action on DE Appl. No. 18/054740 dated Oct. 28, 2025, with machine translation.

* cited by examiner

*Primary Examiner* — Maria Laios
*Assistant Examiner* — Benjamin T Lustgraaf
(74) *Attorney, Agent, or Firm* — Foley & Lardner LLP

(57) ABSTRACT

Provided herein is a battery cell and electrode. The battery cell can include a component. The battery cell can include $M_xF_y$ disposed in the component, where M is a metal element different from Mn, and 1≤x≤3 and 1≤y≤3. The electrode can include an anode active material. The electrode can include a solid electrolyte interphase on the anode active material. The solid electrolyte interphase can include $M_xMn(O_{1-y}F_y)_z$, where M is a metal element different from Mn, and x≥1, 0≤y≤1, and z≥3.

14 Claims, 12 Drawing Sheets

SYSTEMS AND METHODS OF REDUCING OR PREVENTING MANGANESE METAL FORMATION

INTRODUCTION

Batteries can have different power capacities to charge and discharge power to operate machines.

SUMMARY

If exposed directly at the electrode surface in contact with liquid electrolytes, manganese from manganese-containing cathodes can dissolve (in $Mn^{2+}_{(aq.)}$ form), and further react to form manganese metal ($Mn^0$) at the anode, leading to degradation of the battery. Thus there remains a need for apparatuses, systems, and methods that may improve performance of cells comprising manganese-containing cathodes.

At least one aspect is directed to a battery cell. The battery cell can include a component. The battery can include a metal fluoride $M_xF_y$ disposed in the component, where M is a metal element different from Mn (such as Li, K, Ba, Ca, Na, La, Y, Mg, Ce, or Al), $1<x\leq3$ and $1\leq y\leq3$. In some aspects, metal fluoride $M_xF_y$ is one or more of KF, $BaF_2$, and NaF. In some aspects, the component comprises an electrolyte and $M_xF_y$ is present in the electrolyte. In some aspects, the component comprises an anode and $M_xF_y$ is coated on the anode. In some aspects, the component comprises an anode and $M_xF_y$ is incorporated in the anode. In some aspects where the component comprises a coating or an additive, the coating or the additive comprises less than 5 wt % of $M_xF_y$.

In accordance with any of the foregoing aspects, the battery cell may comprise a solid electrolyte interphase, and an amount of $Mn^0$ in the solid electrolyte interphase may be less than an amount of $Mn^0$ in a solid electrolyte interphase of a battery cell without $M_xF_y$. In accordance with any of the foregoing aspects, the battery cell may comprise a solid electrolyte interphase, and the solid electrolyte interphase may comprise a ternary $Mn^{2+}$-containing metal fluoride compound formed by a reaction between $M_xF_y$ and $MnF_2$. In some aspects, an amount of the ternary metal fluoride compound in the solid electrolyte interphase is greater than an amount of ternary metal fluoride compound in a solid electrolyte interphase of a battery cell without $M_xF_y$. Additionally or alternatively, in accordance with any of the foregoing aspects, Mn dissolution from a Mn-containing cathode may form a ternary $Mn^{2+}$-containing metal fluoride compound by a reaction between $M_xF_y$ and Mn from the Mn-containing cathode.

At least one aspect is directed to an electrode. The electrode can include an anode active material. The electrode can include a solid electrolyte interphase on the anode active material. The solid electrolyte interphase can include $M_xMn(O_{1-y}F_y)_z$, where M is a metal element different from Mn (such as Li, K, Ba, Ca, Na, La, Y, Mg, Ce, or Al), $x\geq1$, $0\leq y\leq1$, and $z\geq3$. In some aspects, $M_xMn(O_{1-y}F_y)_z$ comprises $$M_x^1\mathrm{Mn}(O_{1-y}F_y)_z$$

and the anode active material further comprises $$M_a^2F_b,$$

wherein $1\leq a\leq3$ and $1\leq b\leq3$. In some aspects, $M^1$ is selected from K, Na, and Ba. In some aspects $M^2$ is selected from Li, K, Ba, Ca, Na, La, Y, Mg, Ce, and Al. In some aspects, $M_xMn(O_{1-y}F_y)_z$ is one or more of $K_2MnF_4$, $KMnF_3$, $BaMnF_4$, and $NaMnF_3$, and their oxyfluoride compounds $(O_{1-y}F_y)$. In some aspects, $M_xMn(O_{1-y}F_y)_z$ is one or more of $K_2MnF_4$, $KMnF_3$, $BaMnF_4$, and $NaMnF_3$.

At least one aspect is directed to a method. The method can include disposing $M_xF_y$ in a component of a battery cell, where M is a metal element different from Mn (such as Li, K, Ba, Ca, Na, La, Y, Mg, Ce, or Al), $1\leq x\leq3$ and $1\leq y\leq3$. In some aspects, $M_xF_y$ is one or more of KF, $BaF_2$, and NaF. In some aspects, the component comprises an electrolyte and the method comprises disposing $M_xF_y$ in the electrolyte. In some aspects, the component comprises an anode and the method comprises providing a coating comprising $M_xF_y$ on the anode. In some aspects, the component comprises an anode and the method comprises incorporating $M_xF_y$ in the anode. In some aspects where the component comprises a coating or an additive, the coating or the additive comprises less than 5 wt % of $M_xF_y$.

At least one aspect is directed to an electric vehicle. The electric vehicle can include a battery. The battery can include a component. The battery can include $M_xF_y$ disposed in the component, where M is a metal element different from Mn (such as Li, K, Ba, Ca, Na, La, Y, Mg, Ce, or Al), and $1\leq x\leq3$ and $1\leq y\leq3$. In some aspects, $M_xF_y$ is one or more of KF, $BaF_2$, and NaF.

At least one aspect is directed to an electric vehicle. The electric vehicle can include a battery. The battery can include an electrode. The electrode can include an anode active material. The electrode can include a solid electrolyte interphase (SEI) on the anode active material. The solid electrolyte interphase can include $M_xMn(O_{1-y}F_y)_z$, where M is a metal different from Mn (such as Li, K, Ba, Ca, Na, La, Y, Mg, Ce, or Al), $x\geq1$, $0\leq y\leq1$, and $z\geq3$. In some aspects, $M_xMn(O_{1-y}F_y)_z$ is one or more of $K_2MnF_4$, $KMnF_3$, $BaMnF_4$, $NaMnF_3$, and their oxyfluoride compounds $(O_{1-y}F_y)$.

At least one aspect is directed to a system. The system can include a battery. The battery can include a component. The battery can include $M_xF_y$ disposed in the component where M is a metal different from Mn (such as Li, K, Ba, Ca, Na, La, Y, Mg, Ce, or Al), $1\leq x\leq3$ and $1\leq y\leq3$. In some aspects, $M_xF_y$ is one or more of KF, $BaF_2$, and NaF.

At least one aspect is directed to a system. The system can include an electrode. The electrode can include an anode active material. The electrode can include a solid electrolyte interphase on the anode active material. The solid electrolyte interphase can include $M_xMn(O_{1-y}F_y)_z$, where M is a metal different from Mn (such as Li, K, Ba, Ca, Na, La, Y, Mg, Ce, or Al), and $x\geq1$, $0\leq y\leq1$, and $z\geq3$. In some aspects, $M_xMn(O_{1-y}F_y)_z$ is one or more of $K_2MnF_4$, $KMnF_3$, $BaMnF_4$, and $NaMnF_3$, and their oxyfluoride compounds $(O_{1-y}F_y)$.

These and other aspects and implementations are discussed in detail below. The foregoing information and the following detailed description include illustrative examples of various aspects and implementations, and provide an overview or framework for understanding the nature and character of the apparatuses, systems and methods disclosed herein. The drawings provide illustration and a further understanding of the various aspects and implementations, and are incorporated in and constitute a part of this disclosure. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
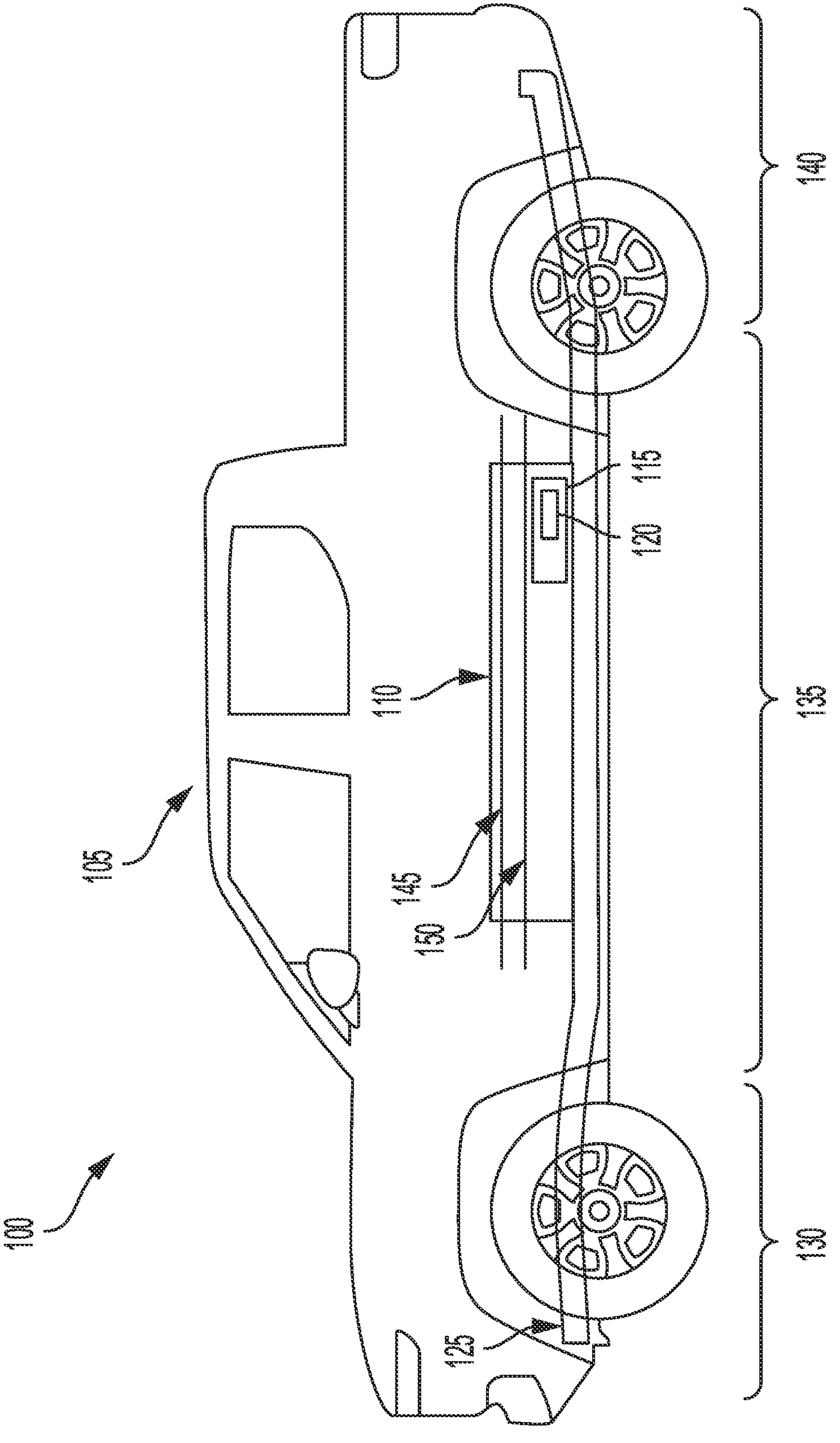
FIG. 1 depicts a cross-sectional view of an electric vehicle, according to an example implementation.

Following below are more detailed descriptions of various concepts related to, and implementations of, methods, apparatuses, and systems of reducing or preventing manganese metal formation. The various concepts introduced above and discussed in greater detail below may be implemented in any of numerous ways.

The present disclosure is directed to apparatuses, systems and methods of reducing or preventing manganese metal formation in a battery. Manganese from manganese-containing cathodes can dissolve in $Mn^{2+}_{(aq.)}$ form in liquid electrolytes, and react to form manganese metal ($Mn^0$) at the anode, leading to degradation of the battery. For example, dissolved manganese ions can react with HF present in an electrolyte to form $MnF_2$ in a solid electrolyte interphase of a battery, and further reduction of $MnF_2$ within the electrochemical cell can lead to manganese metal formation and deposition at the anode. Such manganese metal can increase the polarization of the anode and increase the impedance resistance of the battery. This problem may arise in any battery comprising a Mn-containing cathode. Because the problem stems from dissolution of $Mn^{2+}$, the problem may particularly arise in a battery comprising a $Mn^{2+}$-containing cathode. The problem also may arise in a battery comprising a $Mn^{3+}$-containing cathode, where the $Mn^{3+}$ is subject to disproportionation reaction to $Mn^{2+}$ and $Mn^{4+}$. A continuous electrochemical reduction of a $Mn^{4+}$-containing cathode, $Mn^{4+}$ may electrochemically reduce to $Mn^{3+}$. $Mn^{4+}$*is generally a more stable species in such batteries under typical operating conditions, as compared to either $Mn^{2+}$ or $Mn^{3+}$ cathodes. Thus, in some aspects, the battery comprises a $LiMn_aFe_{1-a}PO_4$ (LMFP) cathode, where $0 \leq a \leq 1$. In an LMFP cathode, Mn metal has an oxidation state of 2+. In some aspects, the battery comprises a $LiMn_2O_4$ cathode. In a $LiMn_2O_4$ cathode, Mn metal has an oxidation state of 3+ and 4+. In some aspects, the battery comprises a $Li(Ni_bCo_cMn_{1-b-c})O_2$ (NMC or NMCA) cathode. In NMC or NMCA (A is Aluminum), most Mn metal has an oxidation state of 4+.

Addressing this problem, a technical solution described herein is a battery cell including a binary fluoride $Mn^{2+}$ scavenging species disposed in a component. The binary fluoride $Mn^{2+}$ scavenging species may be a metal fluoride species $M_xF_y$, where M is a metal different from Mn (such as Li, K, Ba, Ca, Na, La, Y, Mg, Ce, or Al), and $1 \leq x \leq 3$ and $1 \leq y \leq 3$. In specific aspects, M is K, Ba, or Na. In further specific aspects, $M_xF_y$ is one or more of KF, $BaF_2$, and NaF. In some embodiments, a fraction of the fluorine is doped or substituted by oxygen.

The binary fluoride $Mn^{2+}$ scavenging species may react with $Mn^{2+}$ to form a stable $Mn^{2+}$-containing ternary species (Mn-M-F). Without a scavenging species as described herein, $Mn^{2+}$ ions move to, e.g., a graphite anode, and react to form $MnF_2$, which may be deposited at the anode surface. The stable $Mn^{2+}$-containing ternary species (Mn-M-F) may be deposited at the anode. Specifically, use of the binary fluoride $Mn^{2+}$ scavenging species as described herein may lead to the formation of $M_xMn(O_{1-y}F_y)_z$ (e.g., at the anode), where $x \geq 1$, $0 \leq y \leq 1$, and $z \geq 3$. In specific aspects, $M_xMn(O_{1-y}F_y)_z$ is one or more of $K_2MnF_4$, $KMnF_3$, $BaMnF_4$, and $NaMnF_3$. $M_xMn(O_{1-y}F_y)_z$ can be one or more of oxyfluoride compounds $(O_{1-y}F_y)$ of $K_2MnF_4$, $KMnF_3$, $BaMnF_4$, and $NaMnF_3$. In some embodiments, a fraction of fluorine can be doped or substituted by oxygen. For example, with an electrode including an anode active material, wherein the electrode includes a solid electrolyte interphase (SEI) on the anode active material, the solid electrolyte interphase (SEI) may include $M_xMn(O_{1-y}F_y)_z$, where M is a metal different from Mn, and $x \geq 1$, $0 \leq y \leq 1$, and $z \geq 3$.

The disclosed solutions have a technical advantage of reducing or preventing manganese metal formation in the battery cell. The solutions can decrease the cell polarization coming from the anode and decrease the overall impedance resistance of the battery. The solutions can reduce or prevent decrease of battery capacity over time. The solution can reduce or prevent the sudden drop in battery power capability (e.g., smooth acceleration in electric vehicle). The solutions can reduce or decrease the thermodynamic tendency for manganese metal formation. Further details are discussed and illustrated below with reference to the drawings.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
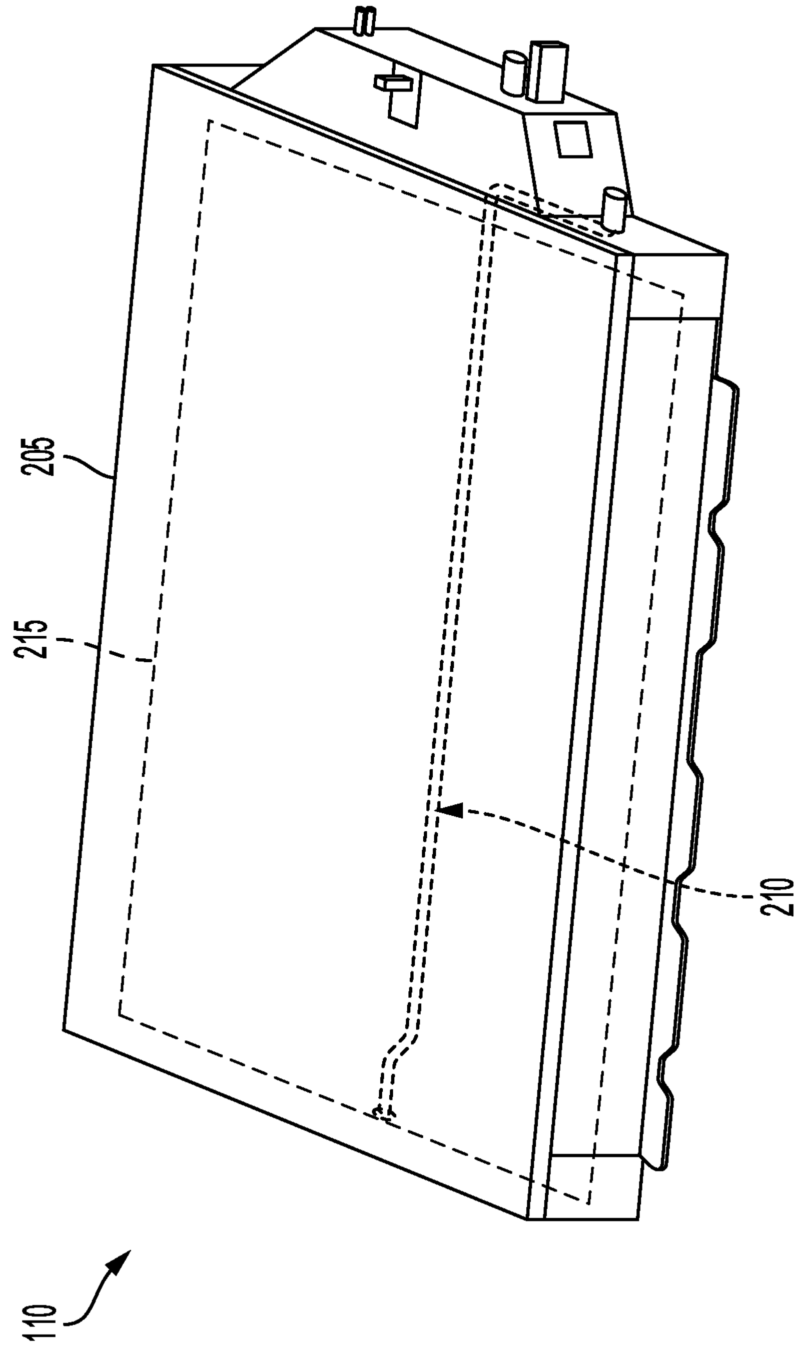
FIG. 2A depicts a battery pack, according to an example implementation.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
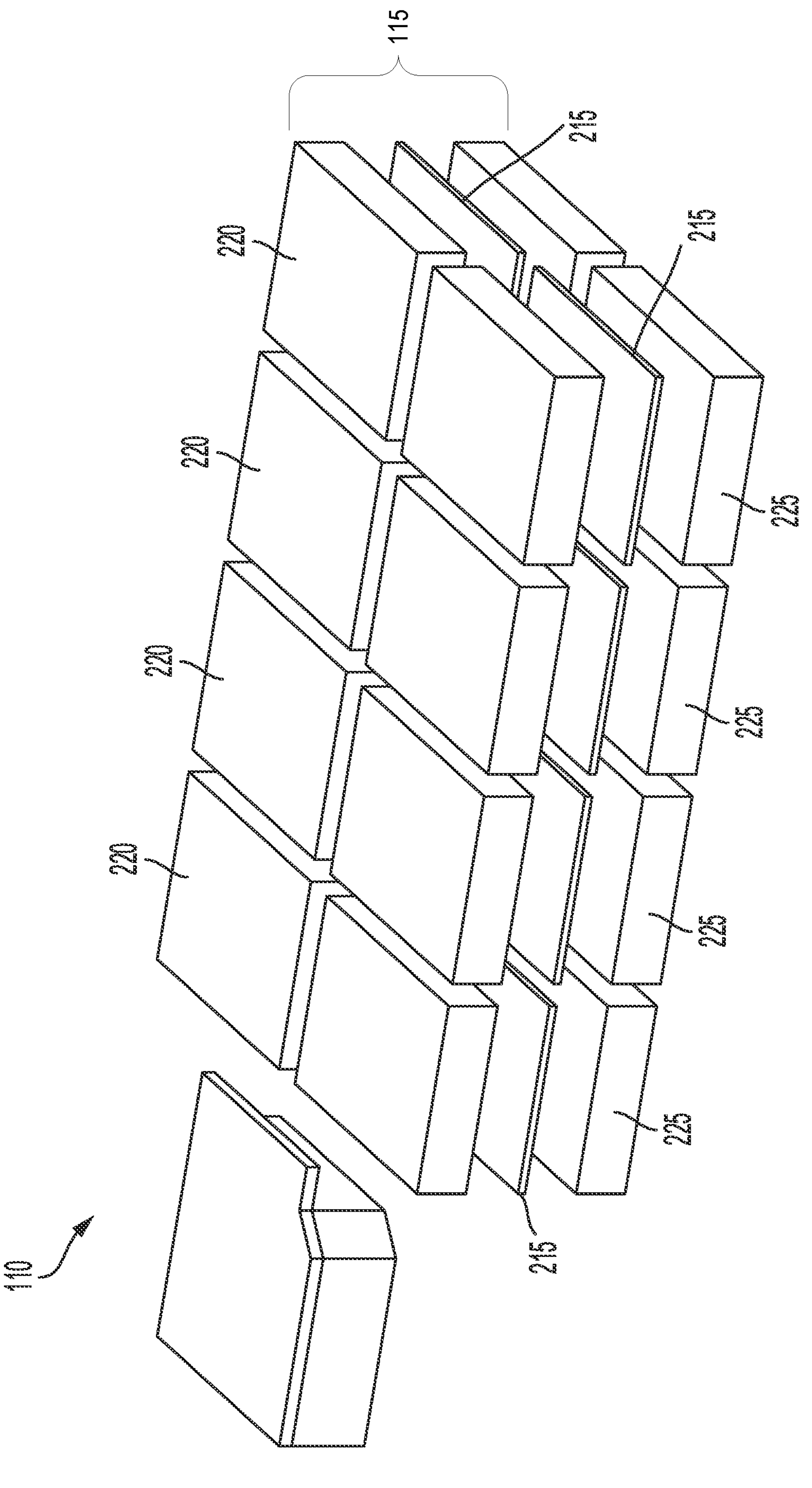
FIG. 2B depicts a battery module, according to an example implementation.
Figure 2C:
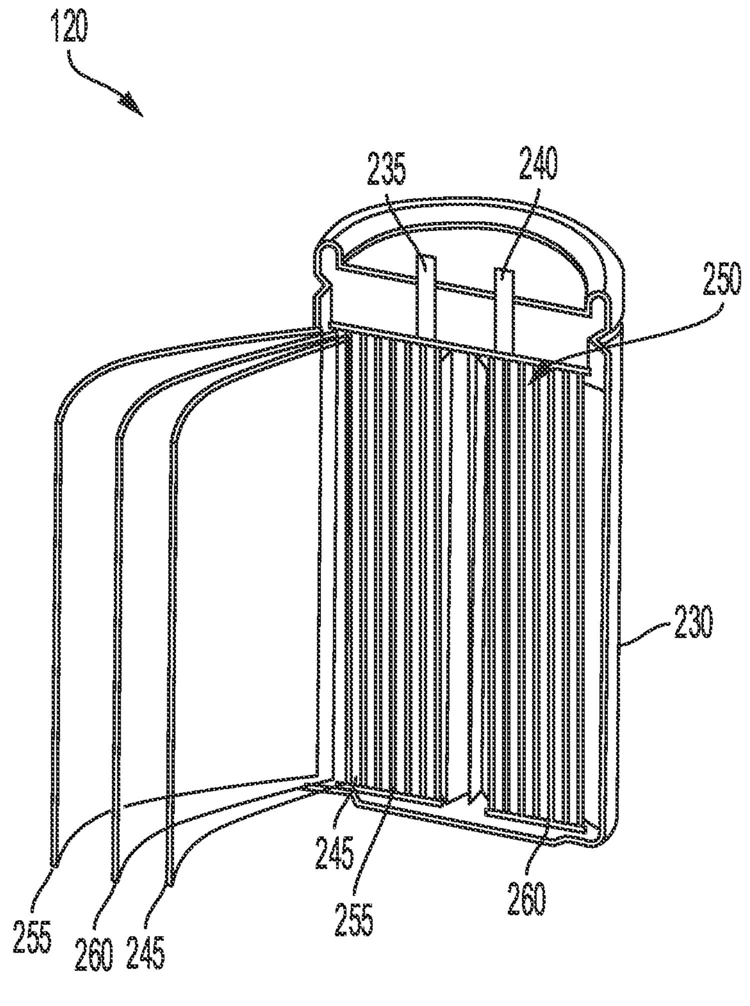
FIG. 2C depicts a cross-sectional view of a battery cell, according to an example implementation.
Figure 2D:
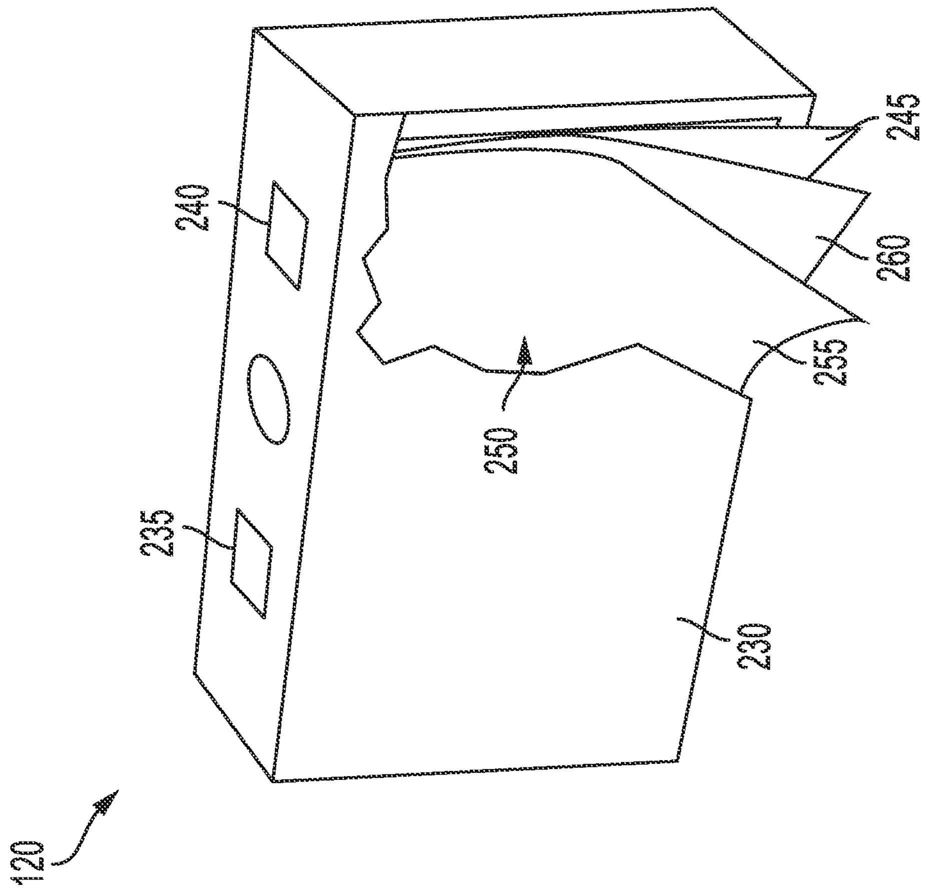
FIG. 2D depicts a cross-sectional view of a battery cell, according to an example implementation.
Figure 2E:
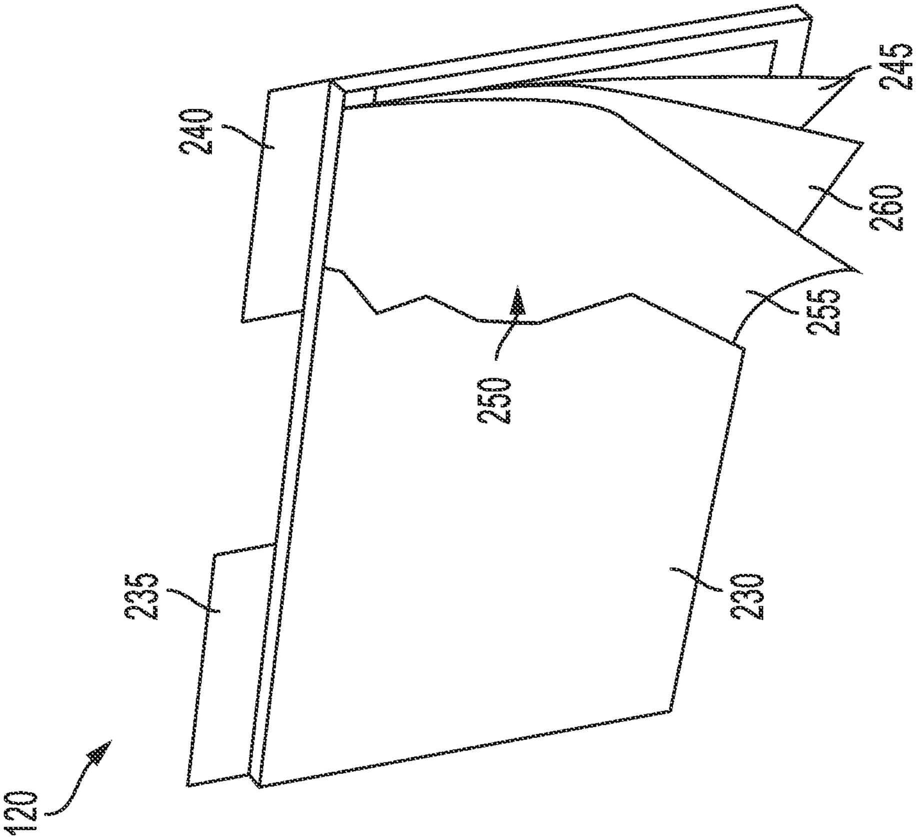
FIG. 2E depicts a cross-sectional view of a battery cell, according to an example implementation.

FIG. 2B depicts example battery modules 115, and FIGS. 2C, 2D and 2E depict an example cross-sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor. As depicted in FIG. 2C, for example, the battery cell 120 can be cylindrical. As depicted in FIG. 2D, for example, the battery cell 120 can be prismatic. As depicted in FIG. 2E, for example, the battery cell 120 can include a pouch form factor. Battery cells 120 can be assembled, for example, by inserting a winded or stacked electrode roll (e.g., a jelly roll) including electrolyte material into at least one battery cell housing 230. The electrolyte material, e.g., an ionically conductive fluid or other material, can support electrochemical reactions at the electrodes to generate, store, or provide electric power for the battery cell by allowing for the conduction of ions between a positive electrode and a negative electrode. The battery cell 120 can include an electrolyte layer where the electrolyte layer can be or include solid electrolyte material that can conduct ions. For example, the solid electrolyte layer can conduct ions without receiving a separate liquid electrolyte material. The electrolyte material, e.g., an ionically conductive fluid or other material, can support conduction of ions between electrodes to generate or provide electric power for the battery cell 120. The housing 230 can be of various shapes, including cylindrical or rectangular, for example. Electrical connections can be made between the electrolyte material and components of the battery cell 120. For example, electrical connections to the electrodes with at least some of the electrolyte material can be formed at two points or areas of the battery cell 120, for example to form a first polarity terminal 235 (e.g., a positive or anode terminal) and a second polarity terminal 240 (e.g., a negative or cathode terminal). The polarity terminals can be made from electrically conductive materials to carry electrical current from the battery cell 120 to an electrical load, such as a component or system of the electric vehicle 105.

For example, the battery cell 120 can include at least one lithium-ion battery cell. In lithium-ion battery cells, lithium ions can transfer between a positive electrode and a negative electrode during charging and discharging of the battery cell. For example, the battery cell anode can include lithium or graphite, and the battery cell cathode can include a lithium-based oxide material. The electrolyte material can be disposed in the battery cell 120 to separate the anode and cathode from each other and to facilitate transfer of lithium ions between the anode and cathode. It should be noted that battery cell 120 can also take the form of a solid state battery cell developed using solid electrodes and solid electrolytes. Solid electrodes or electrolytes can be or include inorganic solid electrolyte materials (e.g., oxides, sulfides, phosphides, ceramics), solid polymer electrolyte materials, hybrid solid state electrolytes, or any combination thereof. In some implementations, the solid electrolyte layer can include polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some implementations, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethyl-methacrylate (PMMA), and polyvinylidene fluoride (PVDF), among others.

The battery cell 120 can be included in battery modules 115 or battery packs 110 to power components of the electric vehicle 105. The battery cell housing 230 can be disposed in the battery module 115, the battery pack 110, or a battery array installed in the electric vehicle 105. The housing 230 can be of any shape, such as cylindrical with a circular (e.g., as depicted in FIG. 2C, among others), elliptical, or ovular base, among others. The shape of the housing 230 can also be prismatic with a polygonal base, as shown in FIG. 2D, among others. As shown in FIG. 2E, among others, the housing 230 can include a pouch form factor. The housing 230 can include other form factors, such as a triangle, a square, a rectangle, a pentagon, and a hexagon, among others. In some implementations, the battery pack may not include modules (e.g., module-free). For example, the battery pack can have a module-free or cell-to-pack configuration where the battery cells are arranged directly into a battery pack without assembly into a module.

The housing 230 of the battery cell 120 can include one or more materials with various electrical conductivity or thermal conductivity, or any combination thereof. The electrically conductive and thermally conductive material for the housing 230 of the battery cell 120 can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. The electrically insulative and thermally conductive material for the housing 230 of the battery cell 120 can include a ceramic material (e.g., silicon nitride, silicon carbide, titanium carbide, zirconium dioxide, beryllium oxide, and among others) and a thermoplastic material (e.g., polyethylene, polypropylene, polystyrene, polyvinyl chloride, or nylon), among others. In examples where the housing 230 of the battery cell 120 is prismatic (e.g., as depicted in FIG. 2D, among others) or cylindrical (e.g., as depicted in FIG. 2C, among others), the housing 230 can include a rigid or semi-rigid material such that the housing 230 is rigid or semi-rigid (e.g., not easily deformed or manipulated into another shape or form factor). In examples where the housing 230 includes a pouch form factor (e.g., as depicted in FIG. 2E, among others), the housing 230 can include a flexible, malleable, or non-rigid material such that the housing 230 can be bent, deformed, manipulated into another form factor or shape.

The battery cell 120 can include at least one anode layer 245, which can be disposed within the cavity 250 defined by the housing 230. The anode layer 245 can include a first redox potential. The anode layer 245 can receive electrical current into the battery cell 120 and output electrons during the operation of the battery cell 120 (e.g., charging or discharging of the battery cell 120). The anode layer 245 can include an active substance. The active substance can include, for example, an activated carbon or a material infused with conductive materials (e.g., artificial or natural graphite, or blended), lithium titanate ($Li_4Ti_5O_{12}$), or a silicon-based material (e.g., silicon metal, oxide, carbide, pre-lithiated), or other lithium alloy anodes (Li—Mg, Li—Al, Li—Ag alloy etc.) or composite anodes consisting of lithium and carbon, silicon and carbon or other compounds. The active substance can include graphitic carbon (e.g., ordered or disordered carbon with $sp^2$ hybridization), Li metal anode, or a silicon-based carbon composite anode, or other lithium alloy anodes (Li—Mg, Li—Al, Li—Ag alloy etc.) or composite anodes consisting of lithium and carbon, silicon and carbon or other compounds. In some examples, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell does not comprise an anode active material in an uncharged state.

The battery cell 120 can include at least one cathode layer 255 (e.g., a composite cathode layer compound cathode layer, a compound cathode, a composite cathode, or a cathode). The cathode layer 255 can include a second redox potential that can be different than the first redox potential of the anode layer 245. The cathode layer 255 can be disposed within the cavity 250. The cathode layer 255 can output electrical current out from the battery cell 120 and can receive electrons during the discharging of the battery cell 120. The cathode layer 255 can also receive lithium ions during the discharging of the battery cell 120. Conversely, the cathode layer 255 can receive electrical current into the battery cell 120 and can output electrons during the charging of the battery cell 120. The cathode layer 255 can release lithium ions during the charging of the battery cell 120.

The battery cell 120 can include a layer 260 disposed within the cavity 250. The layer 260 can include a solid electrolyte layer. The layer 260 can include a separator wetted by a liquid electrolyte. The layer 260 can include a polymeric material. The layer 260 can include a polymer separator. The layer 260 can be arranged between the anode layer 245 and the cathode layer 255 to separate the anode layer 245 and the cathode layer 255. The polymer separator can physically separate the anode and cathode from a cell short circuit. A separator can be wetted with a liquid electrolyte. The liquid electrolyte can be diffused into the anode layer 245. The liquid electrolyte can be diffused into the cathode layer 255. In the case of a solid electrolyte, the layer 260 can help transfer ions (e.g., $Li^+$ ions) between the anode layer 245 and the cathode layer 255. The layer 260 can transfer $Li^+$ cations from the anode layer 245 to the cathode layer 255 during the discharge operation of the battery cell 120. In the case of a solid electrolyte, the layer 260 can transfer lithium ions from the cathode layer 255 to the anode layer 245 during the charge operation of the battery cell 120. When wetted by a liquid electrolyte, ions (e.g., $Li^+$ ions) can diffuse through the layer 260 (e.g., polymeric separator layer) between the anode layer 245 and the cathode layer 255. The $Li^+$ cations can diffuse through the layer 260 from the anode layer 245 to the cathode layer 255 during the discharge operation of the battery cell 120. The lithium ions can diffuse through the layer 260 from the cathode layer 255 to the anode layer 245 during the charge operation of the battery cell 120.

The redox potential of layers (e.g., the first redox potential of the anode layer 245 or the second redox potential of the cathode layer 255) can vary based on a chemistry of the respective layer or a chemistry of the battery cell 120. For example, lithium-ion batteries can include an LFP (lithium iron phosphate) chemistry, an LMFP (lithium manganese iron phosphate) chemistry, an NMC (Nickel Manganese Cobalt) chemistry, an NCA (Nickel Cobalt Aluminum) chemistry, an OLO (Over Lithiated Oxide) chemistry, or an LCO (lithium cobalt oxide) chemistry for a cathode layer (e.g., the cathode layer 255). Lithium-ion batteries can include a graphite chemistry, a silicon-graphite chemistry, or a lithium metal chemistry for the anode layer (e.g., the anode layer 245).

For example, for a cathode layer (e.g., for cathode layer 255), lithium-ion batteries can include an olivine phosphate ($LiMPO_4$, M=Fe and/or Co and/or Mn and/or Ni)) chemistry, LISICON or NASICON Phosphates ($Li_3M_2(PO_4)_3$ and $LiMPO_4O_x$, M=Ti, V, Mn, Cr, and Zr), for example lithium iron phosphate (LFP), lithium iron manganese phosphate (LMFP), layered oxides ($LiMO_2$, M=Ni and/or Co and/or Mn and/or Fe and/or Al and/or Mg), NMC (Nickel Manganese Cobalt) chemistry, an NCA (Nickel Cobalt Aluminum) chemistry, or an LCO (lithium cobalt oxide) chemistry, as well as lithium rich layer oxides ($Li_{1+x}M_{1-x}O_2$) (Ni, and/or Mn, and/or Co), (OLO or LMR), spinel ($LiMn_2O_4$) and high voltage spinels ($LiMn_{1.5}Ni_{0.5}O_4$), disordered rock salt, fluorophosphates such as $Li_2FePO_4F$ (M=Fe, Co, Ni) and fluorosulfates such as $LiMSO_4F$ (M=Co, Ni, Mn). For an anode layer (e.g., for anode layer 245), lithium-ion batteries can include a graphite chemistry, a silicon-graphite chemistry, or a lithium metal chemistry. For example, a cathode layer having an LFP chemistry can have a redox potential of 3.4 V vs. $Li/Li^+$, while an anode layer having a graphite chemistry can have a 0.2 V vs. $Li/Li^+$ redox potential.

Electrode layers can include anode active material or cathode active material, commonly in addition to a conductive carbon material, a binder, or other additives as a coating on a current collector (metal foil). The chemical composition of the electrode layers can affect the redox potential of the electrode layers. For example, cathode layers (e.g., the cathode layer 255) can include medium to high-nickel content (50 to 80%, or equal to 80% Ni) lithium transition metal oxide, such as a particulate lithium nickel manganese cobalt oxide ("LiNMC"), a lithium nickel cobalt aluminum oxide ("LiNCA"), a lithium nickel manganese cobalt aluminum oxide ("LiNMCA"), or lithium metal phosphates like lithium iron phosphate ("LFP") and lithium manganese iron phosphate ("LMFP"). Anode layers (e.g., the anode layer 245) can include conductive carbon materials such as graphite, carbon black, carbon nanotubes, and the like. Anode layers can include Super P carbon black material, Ketjen Black, Acetylene Black, SWCNT, MWCNT, graphite, carbon nanofiber, or graphene, for example.

Electrode layers can also include chemical binding materials (e.g., binders). Binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE") or carboxymethylcellulose ("CMC"). Binder materials can include agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or mixtures of any two or more thereof.

Current collector materials (e.g., a current collector foil to which an electrode active material is laminated to form a cathode layer or an anode layer) can include a metal material. For example, current collector materials can include aluminum, copper, nickel, titanium, stainless steel, or carbonaceous materials. The current collector material can be formed as a metal foil. For example, the current collector material can be an aluminum (Al) or copper (Cu) foil. The current collector material can be a metal alloy, made of Al, Cu, Ni, Fe, Ti, or any combination thereof. The current collector material can be a metal foil coated with a carbon material, such as carbon-coated aluminum foil, carbon-coated copper foil, or other carbon-coated foil material.

The layer 260 can include or be made of a liquid electrolyte material. For example, the layer 260 can be or include at least one layer of polymeric material (e.g., polypropylene, polyethylene, or other material) that is wetted (e.g., is saturated with, is soaked with, receives) a liquid electrolyte substance. The liquid electrolyte material can include a lithium salt dissolved in a solvent. The lithium salt for the liquid electrolyte material for the layer 260 can include, for example, lithium tetrafluoroborate ($LiBF_4$), lithium hexafluorophosphate ($LiPF_6$), and lithium perchlorate ($LiClO_4$), among others. The solvent can include, for example, dimethyl carbonate (DMC), ethylene carbonate (EC), and diethyl carbonate (DEC), among others. Liquid electrolyte is not necessarily disposed near the layer 260, but the liquid electrolyte can be filled into the battery cells 120 in many different ways. On the other hand, the layer 260 can include or be made of a solid electrolyte material, such as a ceramic electrolyte material, polymer electrolyte material, or a glassy electrolyte material, or among others, or any combination thereof.

In some implementations, the solid electrolyte film includes at least one layer of a solid electrolyte. Solid electrolyte materials of the solid electrolyte layer can include inorganic solid electrolyte materials (e.g., oxides, sulfides, phosphides, ceramics), solid polymer electrolyte materials, hybrid solid state electrolytes, or any combination thereof. In some implementations, the solid electrolyte layer includes polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride ($Li_xPO_yN_z$). In some implementations, the solid electrolyte layer can include a glassy, ceramic and/or crystalline sulfide-based electrolyte (e.g., $Li_3PS_4$, $Li_7P_3S_{11}$, $Li_2S—P_2S_5$, $Li_2S—B_2S_3$, $SnS—P_2S_5$, $Li_2S—SiS_2$, $Li_2S—P_2S_5$, $Li_2S—GeS_2$, $Li_{10}GeP_2S_{12}$) and/or sulfide-based lithium argyrodites with formula $Li_6PS_5X$ (X=Cl, Br) like $Li_6PS_5Cl$). Furthermore, the solid electrolyte layer can include a polymer electrolyte material (e.g., a hybrid or pseudo-solid state electrolyte), for example, polyacrylonitrile (PAN), polyethylene oxide (PEO), polymethylmethacrylate (PMMA), and polyvinylidene fluoride (PVDF), among others.

In examples where the layer 260 includes a liquid electrolyte material, the layer 260 can include a non-aqueous polar solvent. The non-aqueous polar solvent can include a carbonate such as ethylene carbonate, propylene carbonate, diethyl carbonate, ethyl methyl carbonate, dimethyl carbonate, or a mixture of any two or more thereof. The layer 260 can include at least one additive. The additives can be or include vinylidene carbonate, fluoroethylene carbonate, ethyl propionate, methyl propionate, methyl acetate, ethyl acetate, or a mixture of any two or more thereof. The layer 260 can include a lithium salt material. For example, the lithium salt can be lithium perchlorate, lithium hexafluorophosphate, lithium bis(fluorosulfonyl)imide, lithium bis(trifluorosulfonyl)imide, or a mixture of any two or more thereof. The lithium salt may be present in the layer 260 from greater than 0 M to about 1.5 M. Once disposed to the battery cell 120, liquid electrolyte can be present and touching battery subcomponents present within the battery cell 120. The battery subcomponents can include the cathode, the anode, the separator, the current collector, etc.

Figure 3:
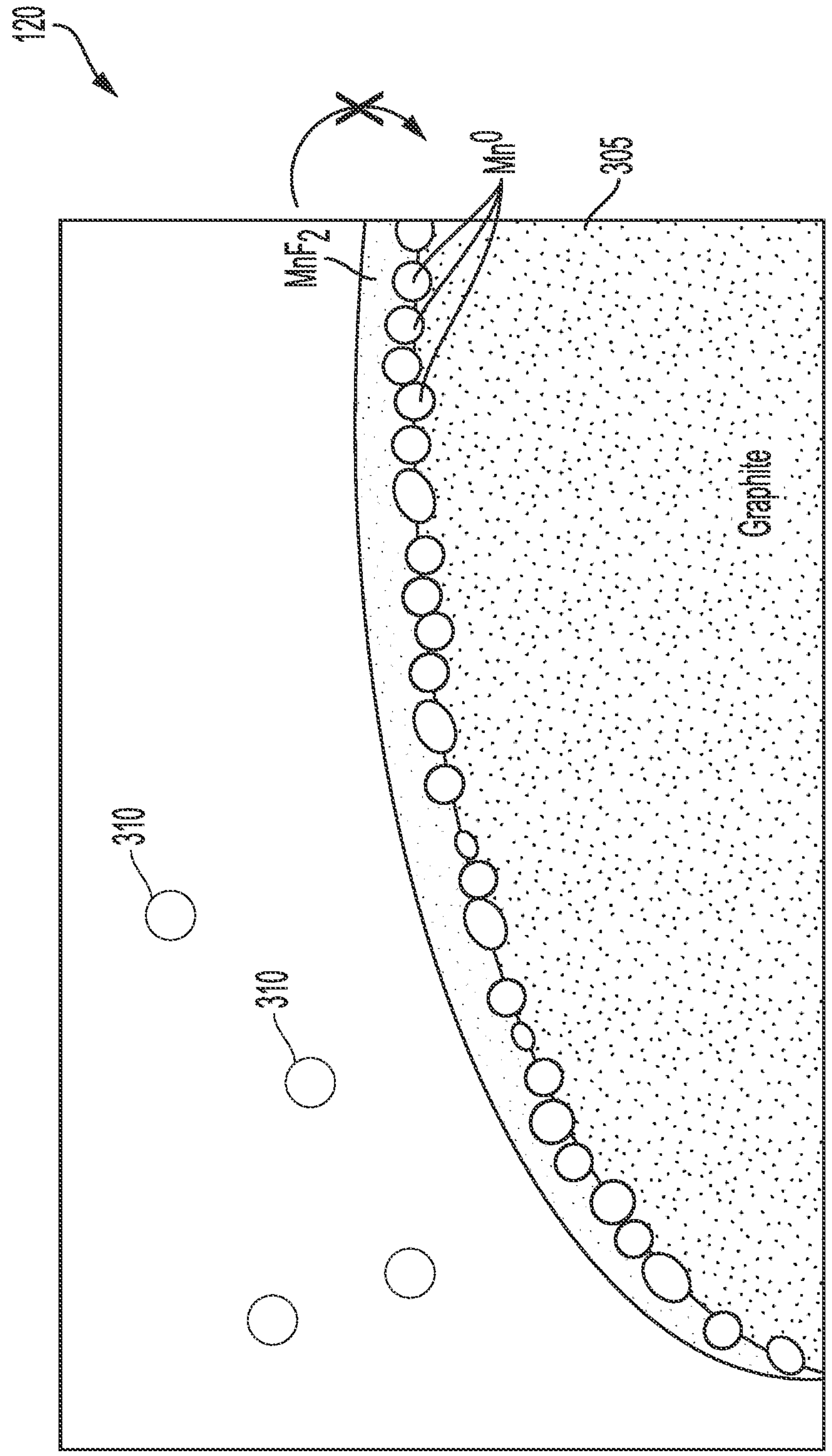
FIG. 3 depicts a perspective view of a portion of a battery cell, according to an example implementation.

FIG. 3 depicts a perspective view of a portion of the battery cell 120. The portion of the battery cell 120 depicted can include an anode graphite electrode. The battery cell 120 can include one or more electrodes 305. The electrode 305 can include the anode layer 245 or the cathode layer 255. The electrode 305 can be disposed within the cavity 250 defined by the housing 230. The electrode 305 can include an anode or a cathode. The anode can include graphite materials (e.g., artificial or natural graphite, or blended). The cathode can include lithium manganese iron phosphate (LMFP), lithium ion manganese oxide (LMO), $LiMO_2$, $Li_{1-x}M_{1-x}O_2$, or $Li_2MnO_3$-containing cathode materials, where $0 \leq x \leq 0.4$. For example, the cathode can include a Mn-rich $LiMO_2$ and $Li_{1-x}M_{1-x}O_2$ layered cathode. In some aspects, the cathode includes $LiMn_aFe_{1-a}PO_4$ (LMFP) material, where $0 \leq a \leq 1$. In some aspects, the cathode includes $LiMn_2O_4$ material. In some aspects, the cathode includes $LiNi_{0.5}Mn_{1.5}O_4$ spinel material. The electrode 305 can include lithium iron phosphate, lithium manganese iron phosphate, lithium nickel manganese cobalt oxide, graphite, over-lithiated layered oxides, lithium manganese nickel oxide, or a combination thereof. The electrode 305 can include an anode active material or a cathode active material.

The battery cell 120 can include one or more components. The component can include the electrode 305. The electrode 305 can include the anode. The anode can include the anode layer 245. The component can include one or more electrolytes 310. The component can include one or more coatings. The component can include one or more additives. As noted above, dissolved $Mn^{2+}$ (e.g., manganese ions) from the cathode or cathode side of the battery cell 120 can move (e.g., diffuse) to the anode or anode side of the battery cell 120. The dissolved $Mn^{2+}$ can form $MnF_2$. For example, $Mn^{2+}$ can react with HF to form $MnF_2$ and $H_2$. The dissolved $Mn^{2+}$ can react with HF according to Equation 1:

$$Mn^{2+} + 2HF \rightarrow MnF_2\downarrow + H_2\uparrow \quad (1)$$

$Mn^{2+}$ can reduce to manganese metal (e.g., metallic manganese, $Mn_{(s)}$, $Mn^0$) at approximately 1.8 V. Thus, the reduction of $Mn^{2+}$ can form manganese metal. For example, reduction of $Mn^{2+}$ can lead to deposition of manganese metal at the anode. Such manganese metal deposits on the anode side can lead to cell polarization, loss of battery capacity, and increased impedance. For example, manganese metal may increase polarization of the anode. The reduction of $Mn^{2+}$ can occur at −1.185 V vs. the standard hydrogen electrode (SHE). The reduction of $Mn^{2+}$ can occur at 1.8 V vs. $Li/Li^+$. The difference between the $Li/Li^+$ potential and SHE is −3.05 V.

The technical solutions of the present disclosure can prevent, reduce, or suppress such manganese metal formation. For example, a technical solution described herein relates to the use of a $Mn^{2+}$ scavenging species. The $Mn^{2+}$ scavenging species may be a binary metal fluoride species ($M_xF_y$). In some aspects, the binary metal fluoride $Mn^{2+}$ scavenging species can form a stable ternary metal fluoride compound that includes (e.g., contains) $Mn^{2+}$ (M-Mn—F). Table 1 provides a listing of suitable metals for the binary metal fluoride $Mn^{2+}$ scavenging species, and examples of corresponding stable $Mn^{2+}$-containing ternary fluoride compounds (M-Mn—F).

| M | Voltage vs. Graphite | M-Mn—F |
|---|---|---|
| Li | −0.2 | $LiMnF_6$ ($Mn^{5+}$), $Li_2MnF_6$ ($Mn^{4+}$), $LiMn_8F_{33}$ ($Mn^{4+}$), $LiMn_2F_9$ ($Mn^{4+}$), $Li_2MnF_6$ ($Mn^{4+}$), $LiMnF_4$ ($Mn^{3+}$) |
| K | −0.09 | $KMnF_4$ ($Mn^{3+}$), $K_2MnF_4$ ($Mn^{2+}$), $KMnF_3$ ($Mn^{2+}$), $K_2MnF_6$ ($Mn^{4+}$) |
| Ba | −0.07 | $Ba_2Mn_2F_{11}$ ($Mn^{3.5+}$), $BaMnF_4$ ($Mn^{2+}$) |
| Ca | −0.03 | $CaMnF_6$ ($Mn^{4+}$) |
| Na | 0.13 | $NaMnF_3$ ($Mn^{2+}$), $Na_5Mn_3F_{14}$ ($Mn^{3+}$) |
| La | 0.46 | — |
| Y | 0.47 | — |
| Mg | 0.47 | $MgMnF_6$ ($Mn^{4+}$) |
| Ce | 0.5 | — |

As reflected in the table, the stable $Mn^{2+}$-containing ternary fluoride compounds (M-Mn—F) may have the chemical formula $M_xMn(O_{1-y}F_y)_z$, where M is a metal element (e.g., metal) different from Mn (such as Li, K, Ba, Ca, Na, La, Y, Mg, Ce, or Al), $x \geq 1$, $0 \leq y \leq 1$, and $z \geq 3$. Additionally or alternatively, use of the binary $Mn^{2+}$ scavenging species ($M_xF_y$) may result in the formation of $M_xMn(O_{1-y}F_y)_z$, e.g., through the formation of one or more intermediates. Specific examples of quaternary species of $M_xMn(O_{1-y}F_y)_z$ include oxyfluorides (which could be represented as Mn-M-F—O), where M is a metal different from Mn, such as K, Na, or Ba. In $M_xMn(O_{1-y}F_y)_z$, x≥1, 0≤y≤1, and z≥3. For example, y can be less than 0.2. The oxyflourides may be formed when reacting with $O^{2-}$ and $O^-$ radicals that may be present within the battery cell 120, during electrochemical decomposition. In another embodiment, oxygen impurities may already be present from the starting $M_xF_y$ precursors. Since the common oxidation state of F is −1 and O is −2, the metal transition oxidation state can be affected upon anion substitutions.

Thus, battery cell 120 can include a binary metal fluoride $Mn^{2+}$ scavenging species ($M_xF_y$) disposed in a component, where M is a metal different from Mn (e.g., a metal cation different from a Mn cation). M can be selected from Li, K, Ba, Ca, Na, La, Y, Mg, Ce, and Al. In some aspects, M is selected from K, Ba and Na (e.g., $K^+$, $Ba^{2+}$, or $Na^+$). In the formula $M_xF_y$, 1≤x≤3 and 1≤y≤3. For example, in some implementations of $M_xF_y$, M is K, x=1, and y=1 (KF), or M is Ba, x=1, and y=2 ($BaF_2$), or M is Na, x=1, and y=1 (NaF). Thus, battery cell 120 can include one or more of KF, $BaF_2$, and NaF.

The binary $Mn^{2+}$ scavenging metal fluoride species $M_xF_y$ can be disposed in the electrolyte 310. In such implementations, $M_xF_y$ can be disposed in the electrolyte 310 as an additive salt. For example, one or more of KF, $BaF_2$, and NaF can be dissolved in the electrolyte 310 as an additive salt. In some aspects the electrolyte 310 includes less than 5 wt % of $M_xF_y$. In some embodiments, the electrolyte 310 can include $M_xF_y$, such as in a range of 0.1 wt % to 5 wt %. For example, the electrolyte 310 can include 0.1 wt % of $M_xF_y$, 0.2 wt % of $M_xF_y$, 0.3 wt % of $M_xF_y$, 0.4 wt % of $M_xF_y$, 0.5 wt % of $M_xF_y$, 0.6 wt % of $M_xF_y$, 0.7 wt % of $M_xF_y$, 0.8 wt % of $M_xF_y$, 0.9 wt % of $M_xF_y$, 1.0 wt % of $M_xF_y$, 1.1 wt % of $M_xF_y$, 1.2 wt % of $M_xF_y$, 1.3 wt % of $M_xF_y$, 1.4 wt % of $M_xF_y$, 1.5 wt % of $M_xF_y$, 1.6 wt % of $M_xF_y$, 1.7 wt % of $M_xF_y$, 1.8 wt % of $M_xF_y$, 1.9 wt % of $M_xF_y$, 2.0 wt % of $M_xF_y$, 2.5 wt % of $M_xF_y$, 3 wt % of $M_xF_y$, 3.5 wt % of $M_xF_y$, 4 wt % of $M_xF_y$, 4.5 wt % of $M_xF_y$ or 5 wt % of $M_xF_y$, or any values in between.

Additionally or alternatively, the binary $Mn^{2+}$ scavenging metal fluoride species $M_xF_y$ can be disposed in or on the anode. For example, $M_xF_y$ (such as one or more of KF, $BaF_2$, or NaF) can be disposed on the anode in a coating (e.g., an anode coating). In such implementations, the coating can include less than 5 wt % of $M_xF_y$. For example, the coating can include less than 5 wt % of $M_xF_y$, less than 4 wt % of $M_xF_y$, less than 3 wt % of $M_xF_y$, less than 2 wt % of $M_xF_y$, or less than 1 wt % of $M_xF_y$. For example, the coating can include 0.5 wt % of $M_xF_y$, 1 wt % of $M_xF_y$, 1.5 wt % of $M_xF_y$, 2 wt % of $M_xF_y$, 2.5 wt % of $M_xF_y$, 3 wt % of $M_xF_y$, 3.5 wt % of $M_xF_y$, 4 wt % of $M_xF_y$, or 4.5 wt % of $M_xF_y$. In some embodiments, the coating can include $M_xF_y$ such as in a range of 0.1 wt % to 5 wt %. For example, the coating can include 0.1 wt % of $M_xF_y$, 0.2 wt % of $M_xF_y$, 0.3 wt % of $M_xF_y$, 0.4 wt % of $M_xF_y$, 0.5 wt % of $M_xF_y$, 0.6 wt % of $M_xF_y$, 0.7 wt % of $M_xF_y$, 0.8 wt % of $M_xF_y$, 0.9 wt % of $M_xF_y$, 1.0 wt % of $M_xF_y$, 1.1 wt % of $M_xF_y$, 1.2 wt % of $M_xF_y$, 1.3 wt % of $M_xF_y$, 1.4 wt % of $M_xF_y$, 1.5 wt % of $M_xF_y$, 1.6 wt % of $M_xF_y$, 1.7 wt % of $M_xF_y$, 1.8 wt % of $M_xF_y$, 1.9 wt % of $M_xF_y$, 2.0 wt % of $M_xF_y$, 2.5 wt % of $M_xF_y$, 3 wt % of $M_xF_y$, 3.5 wt % of $M_xF_y$, 4 wt % of $M_xF_y$, 4.5 wt % of $M_xF_y$ or 5 wt % of $M_xF_y$, or any values in between.

Additionally or alternatively, $M_xF_y$ (such as one or more of KF, $BaF_2$, or NaF) can be incorporated in the anode material. For example, $M_xF_y$ can be a component of a slurry mix used to prepare the anode. In such implementations, the slurry mix can include less than 5 wt % of $M_xF_y$. For example, the slurry mix can include less than 5 wt % of $M_xF_y$, less than 4 wt % of $M_xF_y$, less than 3 wt % of $M_xF_y$, less than 2 wt % of $M_xF_y$, or less than 1 wt % of $M_xF_y$. For example, the coating can include 0.5 wt % of $M_xF_y$, 1 wt % of $M_xF_y$, 1.5 wt % of $M_xF_y$, 2 wt % of $M_xF_y$, 2.5 wt % of $M_xF_y$, 3 wt % of $M_xF_y$, 3.5 wt % of $M_xF_y$, 4 wt % of $M_xF_y$, or 4.5 wt % of $M_xF_y$. In some embodiments, the slurry mix can include $M_xF_y$ such as in a range of 0.1 wt % to 5 wt %. For example, the slurry mix can include 0.1 wt % of $M_xF_y$, 0.2 wt % of $M_xF_y$, 0.3 wt % of $M_xF_y$, 0.4 wt % of $M_xF_y$, 0.5 wt % of $M_xF_y$, 0.6 wt % of $M_xF_y$, 0.7 wt % of $M_xF_y$, 0.8 wt % of $M_xF_y$, 0.9 wt % of $M_xF_y$, 1.0 wt % of $M_xF_y$, 1.1 wt % of $M_xF_y$, 1.2 wt % of $M_xF_y$, 1.3 wt % of $M_xF_y$, 1.4 wt % of $M_xF_y$, 1.5 wt % of $M_xF_y$, 1.6 wt % of $M_xF_y$, 1.7 wt % of $M_xF_y$, 1.8 wt % of $M_xF_y$, 1.9 wt % of $M_xF_y$, 2.0 wt % of $M_xF_y$, 2.5 wt % of $M_xF_y$, 3 wt % of $M_xF_y$, 3.5 wt % of $M_xF_y$, 4 wt % of $M_xF_y$, 4.5 wt % of $M_xF_y$ or 5 wt % of $M_xF_y$, or any values in between. In some embodiments, $M_xF_y$ can be coated or blended with the anode active material for the slurry preparation of the cell electrode. $M_xF_y$ can be coated or deposited physically or chemically on the anode electrode. Additional $M_xF_y$ may be formed during electrochemical activation, cell formation, and/or cell cycling.

Additionally or alternatively, an anode material comprising $M_xF_y$ can be prepared during battery electrode preparation by physical addition to the slurry materials. Another example includes electrode post-treatment with target metal precursor with $F_2$ gas treatment or chemical treatment. Within the electrochemical cell, cell formation by providing additional $M_xF_y$ in an electrolyte can further decompose to form a solid electrolyte interphase (SEI) during electrochemical activation, formation, or cycling of the battery cell. The variation in the voltage cutoff, voltage pulse, C-rate with different current, and/or state-of-charge (SOC) can also impact the SEI formation. The 1st cycle formation of the battery cell 120 can include performing an initial charge and/or discharge operation on the battery cell 120.

As noted above, in some implementations, the binary $Mn^{2+}$ scavenging metal fluoride species $M_xF_y$ can react with $MnF_2$ to form a stable ternary $Mn^{2+}$-containing metal fluoride species (Mn-M-F) as described above, or in some embodiments, oxyfluoride species (e.g., $M_xMn(O_{1-y}F_y)_z$). For example, KF can react with $MnF_2$ to form $K_2MnF_4$; KF can react with $MnF_2$ to form $KMnF_3$; $BaF_2$ can react with $MnF_2$ to form $BaMnF_4$; NaF can react with $MnF_2$ to form $NaMnF_3$, etc. Additionally or alternatively, as noted above, use of the binary $Mn^{2+}$ scavenging species ($M_xF_y$) in the presence of a reactive oxygen species (e.g., which may be present as an impurity or dopant or an electrochemical reduction of $O_2$ gas into $O^{2-}/O^-$) may result in the formation of $M_xMn(O_{1-y}F_y)_z$, (including oxyfluorides), e.g., through the formation of one or more electrolyte decomposed intermediates that contain oxygen species.

Figure 4:
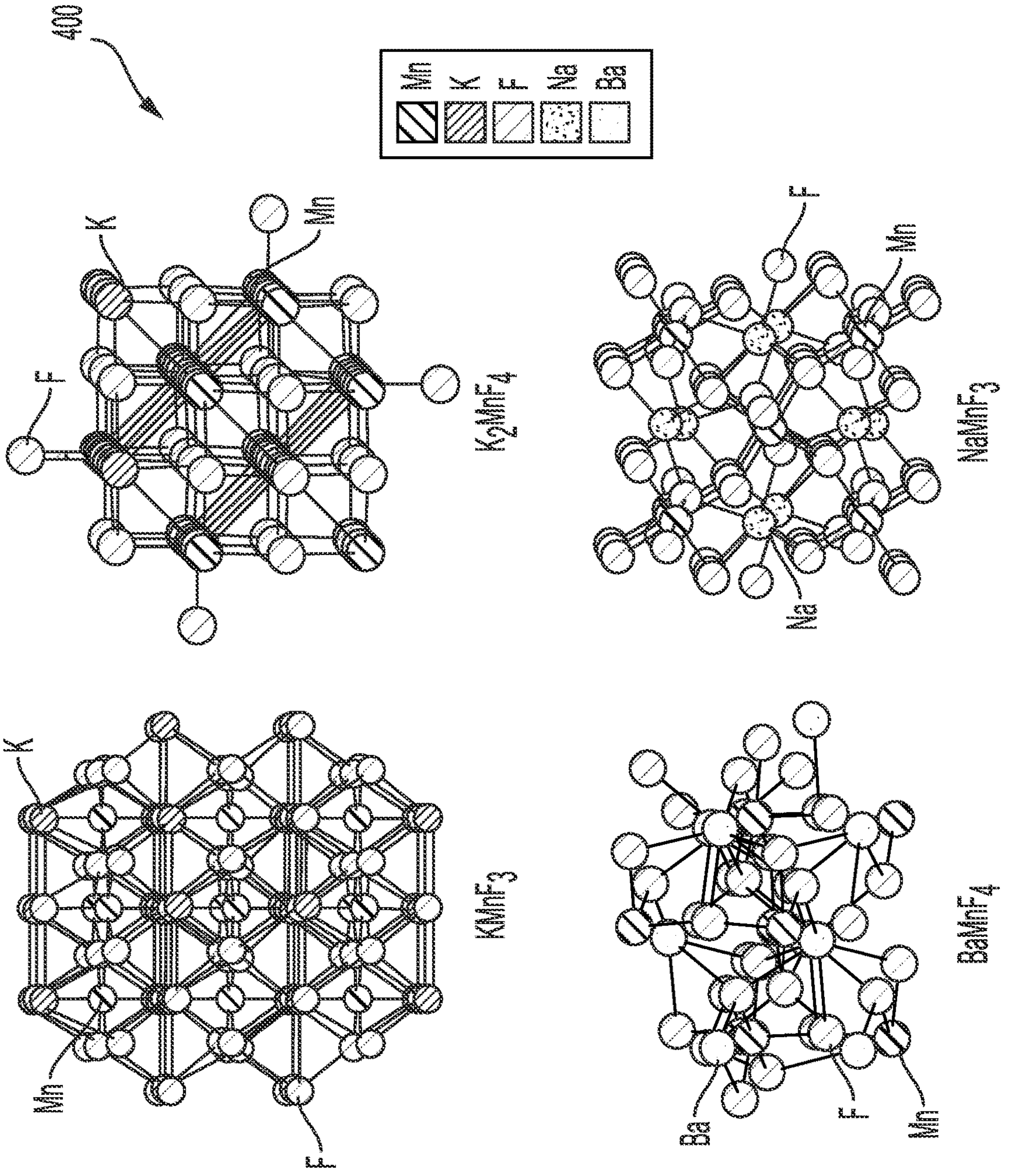
FIG. 4 depicts crystal structures of ternary metal fluorides, according to an example implementation.

FIG. 4 depicts crystal structures 400 of a ternary metal fluoride compound that includes (e.g., contains) $Mn^{2+}$ (M-Mn—F) as disclosed herein. As disclosed above, the ternary Mn-M-F species may be one or more of $K_2MnF_4$, $KMnF_3$, $BaMnF_4$, and $NaMnF_3$. Table 2 below also lists equivalent salts, voltage of the metal (M) vs. graphite, adjusted voltages, and ΔVs. When comparing the voltage difference (ΔV), the ternary Mn-M-F species have a lower voltage difference than $Mn^{2+}$ reduction to $Mn^0$, which can help with suppressing the metallic Mn formation. In addition, ternary compounds shown in FIG. 4 can have a different bond breaking nature, when compared with pure $MnF_2$. While the Mn—F bond would only be present in $MnF_2$, all compounds in FIG. 4 can have additional M-Mn and M-F bonds. The electronegativity difference between Mn and F is 2.5, where the electronegativity values of Mn and F are 1.5 and 4.0 respectively. The electronegativity values of K, Ba, and Na are 0.8, 0.9, and 0.9, respectively. Thus, new M-Mn bonds will be polar covalent bond. In addition, new M-F bonds will be more ionic than the Mn—F bond. Changes in the chemical bond natures can further impact the bond breaking, solubility, phase transformation, and electrochemical reaction.

x=1, y=1, and z=3; where M is Ba, x=1, y=1, and z=4, and where M is Na, x=1, y=1, and z=3. Specific examples of quaternary species of $M_xMn(O_{1-y}F_y)_z$ include oxyfluorides (which could be represented as Mn-M-F—O), where M is a metal different from Mn, such as K, Na, or Ba. In $M_xMn(O_{1-y}F_y)_z$, x≥1, 0≤y≤1, and z≥3. For example, y=0.5.

As described above, in some implementations, the binary $Mn^{2+}$ scavenging metal fluoride species $M_xF_y$ can react with $MnF_2$ to form a stable ternary $Mn^{2+}$-containing metal fluoride species (Mn-M-F) as described herein, or metal oxyfluoride species: e.g., $M_xMn(O_{1-y}F_y)_z$. In such implementations, an amount of the stable ternary $Mn^{2+}$-containing metal fluoride species (Mn-M-F) in the solid electrolyte interphase 505 can be greater than an amount of such species

| Ternary Compound | Equivalent salts | M vs. Graphite | Adjusted Voltage | ΔV |
|---|---|---|---|---|
| $K_2MnF_4$ | $2KF + MnF_2$ | −0.09 | −0.09 * (⅔) + 1.65 * (⅓) = 0.49 | −1.16 |
| $KMnF_3$ | $KF + MnF_2$ | −0.09 | −0.09 * (½) + 1.65 * (½) = 0.78 | −0.87 |
| $BaMnF_4$ | $BaF_2 + MnF_2$ | −0.07 | −0.07 * (½) + 1.65 * (½) = 0.79 | −0.86 |
| $NaMnF_3$ | $NaF + MnF_2$ | 0.13 | 0.13 * (½) + 1.65 * (½) = 0.89 | −0.76 |

Figure 5:
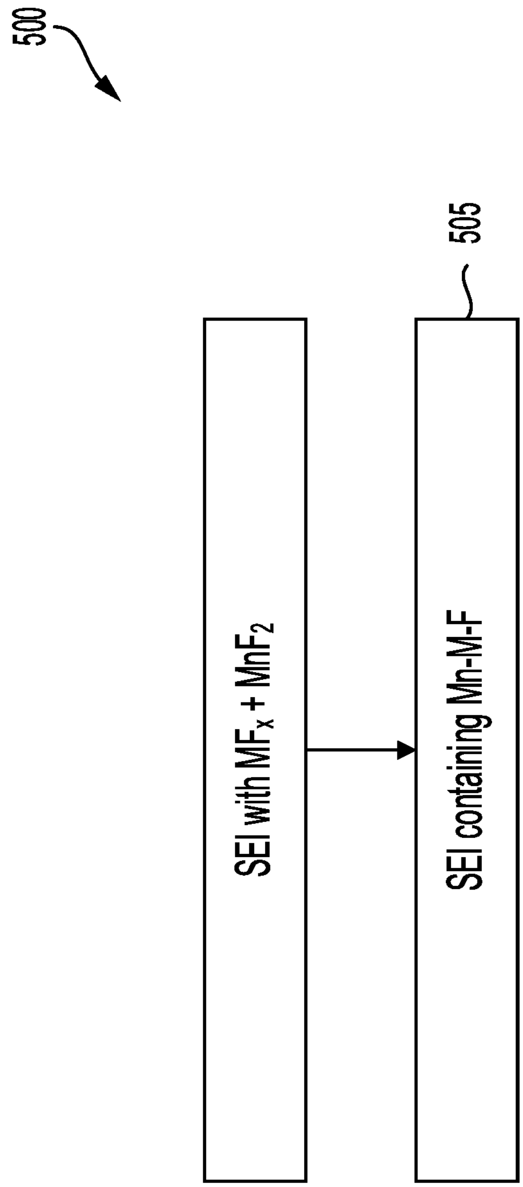
FIG. 5 depicts a diagram of solid electrolyte interphases, according to an example implementation.

FIG. 5 depicts a diagram 500 of solid electrolyte interphases (SEIs) of a battery cell as described herein, wherein binary $Mn^{2+}$ scavenging metal fluoride species $M_xF_y$ as described herein is provided in the electrolyte. During cycling, the $M_xF_y$ in the electrolyte reacts with $MnF_2$ also present in the electrolyte (e.g., resulting from dissolution of manganese from the cathode) to form a ternary Mn-M-F species as described herein, resulting in a solid electrolyte interphase 505 that includes the ternary Mn-M-F species. Mn dissolution from a Mn-containing cathode can form a ternary $Mn^{2+}$-containing metal fluoride compound by a reaction between $M_xF_y$ and Mn from the Mn-containing cathode. Due to $Mn^{2+}$ scavenging by the binary $Mn^{2+}$ scavenging metal fluoride species $M_xF_y$, formation of manganese metal ($Mn^0$) is reduced due to changes in the local structure. As a result, an amount of $Mn^0$ in the solid electrolyte interphase 505 can be less than an amount of $Mn^0$ in a solid electrolyte interphase of a battery cell that is not provided with $M_xF_y$. That is, the amount of $Mn^0$ in a solid electrolyte interphase of a battery cell without $M_xF_y$ can be greater than the amount of $Mn^0$ in the solid electrolyte interphase 505 as described herein.

The battery cell 120 can include solid electrolyte interphase 505. The solid electrolyte interphase 505 can be on (e.g., disposed on) the anode active material. As described above, the anode active material can include a binary $Mn^{2+}$ scavenging metal fluoride species $M_xF_y$ as described herein, in addition to or as an alternative to a binary $Mn^{2+}$ scavenging metal fluoride species $M_xF_y$ being present in the electrolyte. As also described above, the solid electrolyte interphase 505 can include a ternary metal fluoride species (Mn-M-F) or metal oxyfluorides ($M_xMn(O_{1-y}F_y)_z$). For example, the solid electrolyte interface can include one or more of $K_2MnF_4$, $KMnF_3$, $BaMnF_4$, and $NaMnF_3$. The solid electrolyte interface can be one or more of oxyfluoride compounds ($O_{1-y}F_y$) of $K_2MnF_4$, $KMnF_3$, $BaMnF_4$, and $NaMnF_3$, including combinations of any two or more thereof.

Thus, in some aspects, the solid electrolyte interphase 505 can include $M_xMn(O_{1-y}F_y)_z$, where M is a metal different from Mn, such as K, Na, or Ba and x≥1, y=1, and z≥3. Specific examples of ternary species of $M_xMn(O_{1-y}F_y)_z$ include where M is K, x=2, y=1, and z=4; where M is K, present in a solid electrolyte interphase of a battery cell that is not provided with a binary $Mn^{2+}$ scavenging metal fluoride species $M_xF_y$. That is, the amount of ternary $Mn^{2+}$-containing metal fluoride species (Mn-M-F, e.g., $M_xMn(O_{1-y}F_y)_z$) in a solid electrolyte interphase of a battery cell without $M_xF_y$ can be less than the amount in a solid electrolyte interphase 505 as described herein. As described above, the binary $Mn^{2+}$ scavenging metal fluoride species $M_xF_y$ can be incorporated into the solid electrolyte interphase 505 on the anode during formation of the battery cell 120.

Additionally or alternatively, the ternary $Mn^{2+}$-containing metal fluoride species (Mn-M-F) is represented as $$M_x^1\mathrm{Mn}(O_{1-y}F_y)_z,$$

where $M_1$ is a metal different from Mn, such as K, Na, or Ba, and the anode active material may includes $$M_a^2F_b$$

as a binary $Mn^{2+}$ scavenging metal fluoride species, where $M^2$ is a metal different from Mn, such as one or more selected from Li, K, Ba, Ca, Na, La, Y, Mg, Ce, and Al. In the formula $$M_a^2F_b,$$

1≤a≤3 and 1≤b≤3.

Figure 6:
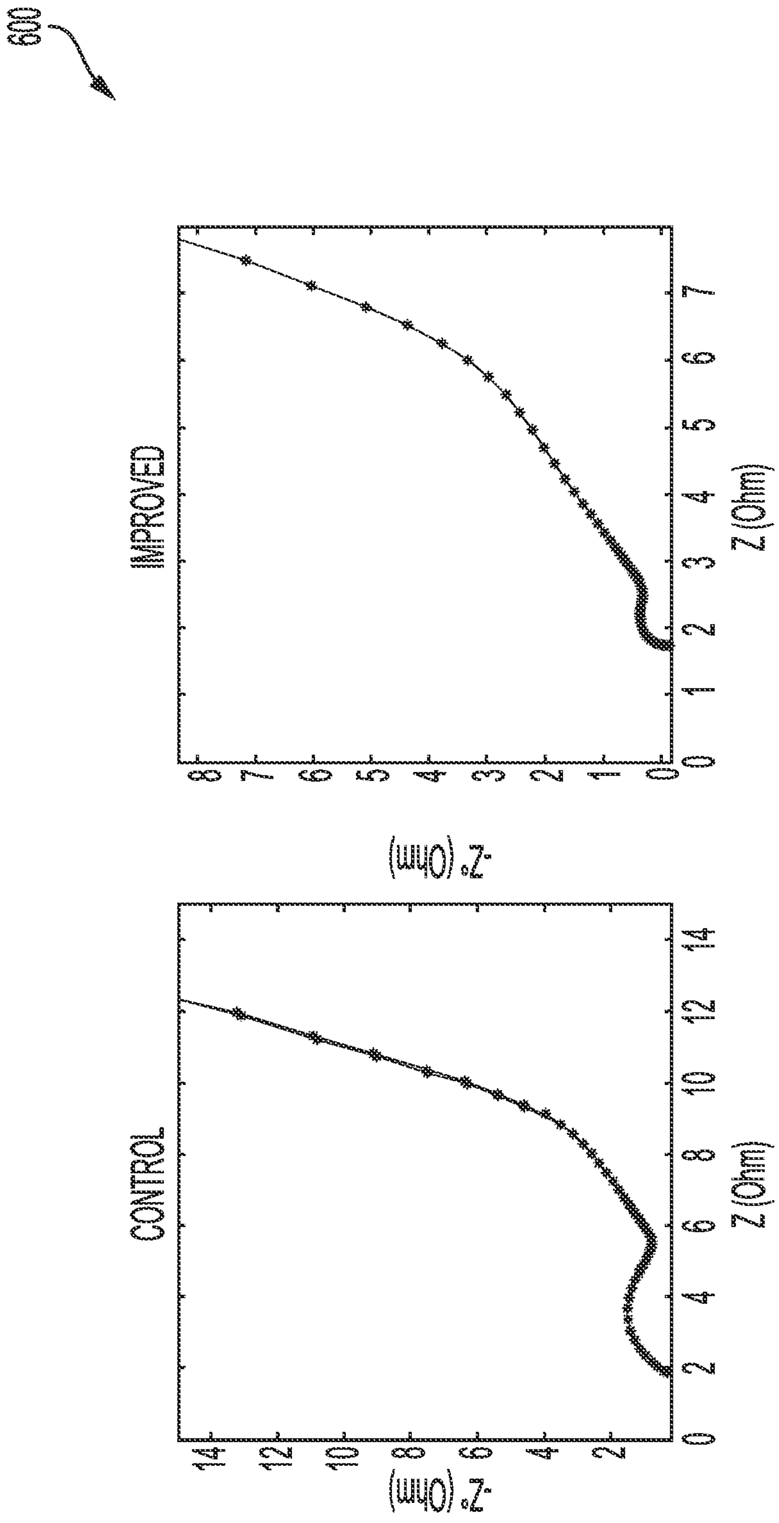
FIG. 6 depicts Nyquist plots of a control electrode and an improved electrode, illustrating results that could be achieved by an example implementation.

FIG. 6 depicts Nyquist plots 600 of a control battery cell and an improved battery cell illustrating improved properties that could be achieved in a battery cell as described herein. As described above, a battery cell as described herein may include one or more of $K_2MnF_4$, $KMnF_3$, $BaMnF_4$, and $NaMnF_3$ (or oxyfluorides thereof) in the solid electrolyte interphase 505. As a result, a battery cell as described herein can exhibit less polarization than a control battery cell (e.g., a battery cell that does not comprise a binary $Mn^{2+}$ scavenging metal fluoride species $M_xF_y$ as described herein disposed in a component of the battery cell). For example, a battery cell as described herein can exhibit increased ionic conductivity and/or reduced charge transfer resistance and impedance, as compared to a control battery cell. The Nyquist plots 600 presented in FIG. 6 illustrate changes in impedance properties that can be observed when an improved battery cell exhibits increased ionic conductivity and/or reduced charge transfer resistance as compared to a control battery cell. These improvements are reflected in the smaller sized semicircle for the "improved" battery cell in FIG. 6 in the low frequency regions.

Figure 7:
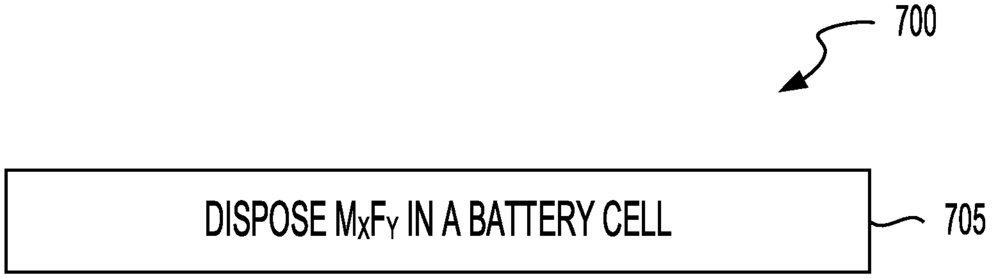
FIG. 7 depicts a method of reducing or preventing manganese metal formation, according to an example implementation.

FIG. 7 depicts a method 700 of reducing or preventing manganese metal formation in a battery cell as described herein. The method 700 can include disposing a binary $Mn^{2+}$ scavenging metal fluoride species $M_xF_y$ as described herein in the battery cell 120 (ACT 705). For example, the method 700 can include disposing $M_xF_y$ in a component of a battery cell 120, such as by providing $M_xF_y$ in the electrolyte, providing $M_xF_y$ in an anode coating, or incorporating $M_xF_y$ in the anode material. $M_xF_y$ can be present in the electrolyte, such as being dissolved in the electrolyte. The method 700 also can include disposing $M_xF_y$ in a coating or additive disposed on the anode. The method 700 also can include providing a battery cell 120 with a ternary metal fluoride compound as described herein (Mn-M-F). The battery cell 120 can include a solid electrolyte interphase 505. The solid electrolyte interphase 505 can include a ternary metal fluoride compound as described herein (Mn-M-F). Additionally or alternatively, the solid electrolyte interphase 505 can include $M_xMn(O_{1-y}F_y)_z$, where M is a metal different from Mn, such as K, Na, or Ba. In $M_xMn(O_{1-y}F_y)_z$, x≥1, 0≤y≤1, and z≥3. Specific examples of $M_xMn(O_{1-y}F_y)_z$ include where M is K, x=2, y=1, and z=4; where M is K, x=1, y=1, and z=3; where M is Ba, x=1, y=1, and z=4, and where M is Na, x=1, y=1, and z=3. The solid electrolyte interphase 505 can include oxyfluorides.

Figure 8:
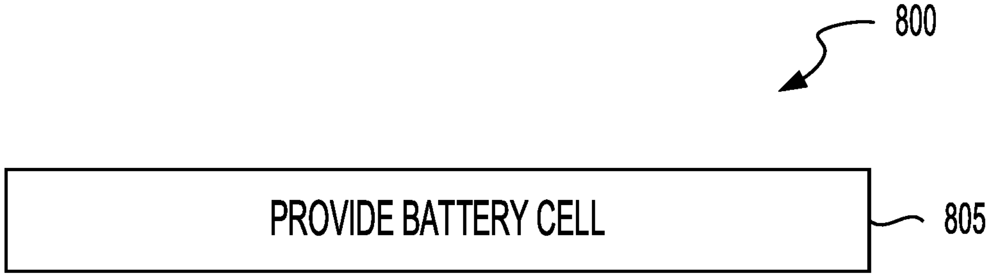
FIG. 8 depicts a method of providing a battery cell, according to an example implementation.

FIG. 8 depicts a method 800 of providing battery cell 120 (ACT 805). The battery cell 120 can include a component wherein a binary $Mn^{2+}$ scavenging metal fluoride species $M_xF_y$ as described herein is disposed in the component. The battery cell 120 can include electrode 305. The electrode 305 can include anode active material. The electrode 305 can include solid electrolyte interphase 505 on the anode active material. The solid electrolyte interphase 505 can include $M_xMn(O_{1-y}F_y)_z$, where M is a metal different from Mn, such as K, Na, or Ba. In $M_xMn(O_{1-y}F_y)_z$, x≥1, 0≤y≤1, and z≥3. Specific examples of $M_xMn(O_{1-y}F_y)_z$ include where M is K, x=2, y=1, and z=4; where M is K, x=1, y=1, and z=3; where M is Ba, x=1, y=1, and z=4, and where M is Na, x=1, y=1, and z=3. The solid electrolyte interphase 505 can include oxyfluorides.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to “approximately,” “substantially” or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method, comprising:

disposing $M_xF_y$ in a battery cell, wherein M is a metal element different from Mn, and $1 \leq x \leq 3$ and $1 \leq y \leq 3$;

disposing a Mn-containing cathode in the battery cell, the Mn-containing cathode being a source of manganese ions;

reacting the manganese ions from the Mn-containing cathode with the $M_xF_y$ upon cycling of the battery cell;

reacting the $M_xF_y$ and $MnF_2$ to form a ternary $Mn^{2+}$-containing metal fluoride; and forming a solid electrolyte interphase comprising the ternary $Mn^{2+}$-containing metal fluoride upon cycling of the battery cell.

2. The method of claim 1, wherein a component of the battery cell comprises an electrolyte and the method comprises disposing the $M_xF_y$ in the electrolyte.

3. The method of claim 1, wherein a component of the battery cell comprises an anode and the method comprises disposing the $M_xF_y$ in a coating or additive disposed on the anode.

4. The method of claim 1, wherein a component of the battery cell comprises an anode and the method comprises incorporating the $M_xF_y$ in the anode.

5. The method of claim 1, comprising:

dissolving the manganese ions from the Mn-containing cathode into a liquid electrolyte of the battery cell.

6. The method of claim 1, wherein the ternary $Mn^{2+}$-containing metal fluoride is one or more selected from $K_2MnF_4$, $KMnF_3$, $BaMnF_4$, and $NaMnF_3$.

7. The method of claim 1, wherein M is selected from Li, K, Ba, Ca, Na, La, Y, Mg, Ce, and Al.

8. The method of claim 1, wherein disposing the $M_xF_y$ in the battery cell comprises disposing $M_xF_y$ as an additive salt in an electrolyte of the battery cell.

9. The method of claim 1, wherein disposing the $M_xF_y$ in the battery cell comprises disposing less than 5 wt % of the $M_xF_y$ in an electrolyte of the battery cell.

10. The method of claim 1, wherein the $M_xF_y$ is one or more selected from KF, $BaF_2$, and NaF.

11. The method of claim 1, comprising:

wherein an amount of $Mn^0$ in the solid electrolyte interphase is less than an amount of $Mn^0$ in a solid electrolyte interphase of a battery cell without $M_xF_y$.

12. The method of claim 1, wherein an amount of the ternary $Mn^{2+}$-containing metal fluoride in the solid electrolyte interphase is greater than an amount of ternary $Mn^{2+}$-containing metal fluoride in a solid electrolyte interphase of a battery cell without $M_xF_y$.

13. The method of claim 1, comprising:

forming a slurry comprising the $M_xF_y$; and forming an anode from the slurry; and disposing the anode in the battery cell.

14. A method, comprising:

disposing $M_xF_y$ in a battery cell, wherein M is a metal element different from Mn, and $1 < x \leq 3$ and $1 \leq y \leq 3$;

disposing a Mn-containing cathode in the battery cell, the Mn-containing cathode being a source of manganese ions;

reacting the manganese ions from the Mn-containing cathode with the $M_xF_y$ upon cycling of the battery cell; and forming a ternary metal fluoride by reacting the manganese ions from the Mn-containing cathode with the $M_xF_y$, wherein the ternary metal fluoride is one or more selected from $K_2MnF_4$, $KMnF_3$, $BaMnF_4$, and $NaMnF_3$.

* * * * *